US012358608B2

(12) United States Patent
De Wergifosse

(10) Patent No.: US 12,358,608 B2
(45) Date of Patent: Jul. 15, 2025

(54) PITCH CHANGE MECHANISM COMPRISING AN IMPROVED ELECTROHYDRAULIC ACTUATOR

(71) Applicant: Safran Aircraft Engines, Paris (FR)

(72) Inventor: Huguette De Wergifosse, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 21 days.

(21) Appl. No.: 18/564,493

(22) PCT Filed: May 23, 2022

(86) PCT No.: PCT/FR2022/050971
§ 371 (c)(1),
(2) Date: Nov. 27, 2023

(87) PCT Pub. No.: WO2022/248799
PCT Pub. Date: Dec. 1, 2022

(65) Prior Publication Data
US 2024/0239474 A1 Jul. 18, 2024

(30) Foreign Application Priority Data
May 28, 2021 (FR) ...................................... 2105562

(51) Int. Cl.
*B64C 11/38* (2006.01)
*B64C 11/44* (2006.01)
*F01D 7/00* (2006.01)

(52) U.S. Cl.
CPC .............. *B64C 11/38* (2013.01); *B64C 11/44* (2013.01); *F01D 7/00* (2013.01);
(Continued)

(58) Field of Classification Search
CPC . B64C 11/38; B64C 11/44; F01D 7/00; F05D 2260/40311; F05D 2260/76; F05D 2260/79; F05D 2220/7644
See application file for complete search history.

(56) References Cited

U.S. PATENT DOCUMENTS 6,767,187 B2   7/2004   Franchet et al.
6,796,120 B2   9/2004   Franchet et al.
(Continued)

FOREIGN PATENT DOCUMENTS

CH     514 790 A      10/1971
EP     1 306 558 A1   5/2003
EP     1 306 560 A1   5/2003

*Primary Examiner* — J. Todd Newton
(74) *Attorney, Agent, or Firm* — BIRCH, STEWART, KOLASCH & BIRCH, LLP

(57) ABSTRACT

The present invention relates to a pitch change mechanism for a turbine engine propeller (10) comprising: —an electric machine (29) fixedly mounted on a stator portion of the turbine engine and comprising an actuator shaft (21); —an axial piston hydraulic pump (20) suitable for pressurising a hydraulic fluid, the hydraulic pump comprising a body (22) driven by the propeller (10); a barrel (23) housing a set of pistons (24) each comprising a sliding block (25); and a plate (26) that is tilted with respect to the axis of rotation, each sliding block bearing on the plate, one of the plate (26) and the barrel (23) being fixedly connected to the stator portion of the turbine engine and the other of the plate (26) and the barrel (23) being fixed to the actuator shaft (21) for conjoint rotation.

21 Claims, 5 Drawing Sheets

(52) U.S. Cl.
CPC .................. *F05D 2260/40311* (2013.01); *F05D 2260/76* (2013.01); *F05D 2260/79* (2013.01)

(56) References Cited

U.S. PATENT DOCUMENTS

| | | | |
|---|---|---|---|
| 2003/0077183 A1* | 4/2003 | Franchet | F15B 7/10 417/357 |
| 2014/0034779 A1* | 2/2014 | Fenny | B64C 27/72 416/1 |
| 2014/0193261 A1 | 7/2014 | Frantz et al. | |
| 2018/0128289 A1 | 5/2018 | Goguet-Chapuis et al. | |
| 2024/0239474 A1* | 7/2024 | De Wergifosse | B64C 11/44 |
| 2024/0253770 A1* | 8/2024 | De Wergifosse | F04B 1/324 |
| 2024/0253771 A1* | 8/2024 | De Wergifosse | F15B 1/022 |
| 2025/0042536 A1* | 2/2025 | Roda | F04B 1/22 |

* cited by examiner

PITCH CHANGE MECHANISM COMPRISING AN IMPROVED ELECTROHYDRAULIC ACTUATOR

GENERAL TECHNICAL FIELD

The disclosure relates to the field of turbomachines comprising a propeller or a variable-setting fan. More specifically, the disclosure relates to a system for actuating the pitch of a propeller or of a fan of such a turbomachine.

BACKGROUND

Different turbomachine architectures have recourse to a propeller (turboprop, open rotor) or a fan (turbojet engine) with variable setting. This variability allows the turbomachine to adapt to variable flight conditions by maintaining a favorable angle of incidence of the air on the blades. The variability of the setting is particularly necessary for rotor having a low compression ratio, such as the propellers of turboprops and the fans of turbomachines having a high expansion ratio (ratio of the rate of the secondary flow (cool) to the rate of the primary flow (through the primary body).)

Many pitch change mechanisms have been conceived to vary the setting of the blades of a propeller or of a fan. These mechanisms generally include a setting of the blade in rotation about its main axis by way of a rod actuated by an actuator. The actuator is supplied with hydraulic fluid (for example oil) coming from a lubrication unit of the turbomachine, the variation in the delivered hydraulic fluid pressure making it possible to vary the change in pitch. In order to transfer the supply of hydraulic fluid of the pitch change mechanism from a fixed frame of reference (lubrication unit) of the turbomachine to a rotating frame of reference (of the fan), an OTB (Oil Transfer Bearing) is generally used. In a manner known per se, the OTB comprises a fixed part which is fixed with respect to a stator part of the turbomachine and which is connected, via dedicated channels, to the lubrication unit comprising an oil tank and a pump, and a rotating part which moves as one part with a rotor part of the turbomachine. However, the OTB is a complex and fragile device, liable to generate malfunctions, particularly significant oil leaks affecting the reliability of the turbomachine and requiring the installation of scavenge pumps and the overdimensioning of the oil tank, which can be subject to feeding problems during certain maneuvers. Moreover, this configuration has limitations regarding operating at low ratings since it is dependent on the rating of the high-pressure body of the turbomachine. Finally, this configuration requires a lock of the blade pitch ("pitch lock") which is heavy, complex, expensive and prone to locking.

In addition, since the starting of the lubrication unit is generally related to the starting of the turbomachine, it is necessary to make provision for auxiliary systems to provide certain protection functions, particularly in the case of an overspeed or an engine shutdown. It is therefore necessary to make provision for a feathering system that functions even in the event of an absence of hydraulic fluid pressure.

Moreover, the pitch change mechanism must be able to ensure the exit from the feathered position with the engine shut down.

SUMMARY

One aim of the disclosure is to make provision for a variable-setting turbomachine which overcomes the drawbacks of the prior art mentioned below.

Another aim of the disclosure is to make provision for an independent pitch change mechanism which dispenses with the difficulties related to the transfer of hydraulic fluid from a fixed frame of reference to a rotary frame of reference.

Yet another aim of the disclosure is to make provision for a pitch change mechanism that can be used whatever the operation of the turbomachine, which is moreover capable of ensuring the functions of protection and feathering of the blades of the propeller/of the fan of the turbomachine, preferably without being dependent on an electric control system.

Another aim of the disclosure is to make provision for a pitch change mechanism which can be both implemented in a turboprop-type or open rotor-type turbomachine comprising a propeller and a turbojet engine comprising a fan.

For this purpose, according to a first aspect, the disclosure proposes a pitch change mechanism for a turbomachine propeller, said turbomachine comprising a stator part and a rotor part, said pitch change mechanism comprising an electrohydraulic actuator comprising:
- an electric machine fixedly mounted on the stator part of the turbomachine and comprising an actuating shaft rotationally movable about an axis of rotation;
- an axial-piston hydraulic pump suitable for pressurizing a hydraulic fluid, the hydraulic pump comprising:
  - a body driven by the propeller;
  - a barrel housing a set of pistons circumferentially distributed around the axis of rotation, each piston comprising a sliding pad; and
  - a plate inclined with respect to the axis of rotation, each sliding pad bearing on the plate,
- one from among the inclined plate and the barrel being fixedly connected to the stator part of the turbomachine to prevent its rotation about the actuating axis and the other from among the inclined plate and the barrel being rotationally secured to the actuating shaft.

The disclosure is advantageously completed by the following features, taken alone or in any of their technically possible combinations:
- the electric machine is an asynchronous machine;
- the inclined plate is fixedly connected to the stator part of the turbomachine, the mechanism further comprising a first bearing configured to support the actuating shaft and a second bearing configured to support the plate;
- the first bearing is mounted between the actuating shaft and the plate;
- the second bearing is mounted between the plate and the body;
- the plate comprises a first portion comprising a face inclined with respect to the axis of rotation on which the sliding pads then bear, and a second portion configured to be attached to the stator part of the turbomachine;
- the barrel is fixedly connected to the stator part of the turbomachine, the mechanism further comprising a first bearing configured to support the plate and a second bearing configured to support the barrel;
- the first bearing is mounted between the plate and the barrel;
- the second bearing is mounted between the barrel and the body;
- the turbomachine further comprises a planetary mechanical reducer comprising a sun gear, a ring gear coaxial with the sun gear and configured to rotationally drive the propeller and a series of planet gears circumferentially distributed around the axis of rotation of the reduction gear between the sun gear and the ring gear, each planet gear being mounted on a planet carrier which is fixed with respect to a stator part of the turbomachine;

the element from among the plate and the barrel which is fixedly connected to the stator part of the turbomachine is mounted on the planet carrier;

a pitch of the propeller is controlled by torque control of the electric machine;

the pitch change mechanism further comprises a hydraulic fluid reservoir which is rotationally secured to the propeller;

the body delimits a cavity filled with hydraulic fluid, the pitch change mechanism further comprising:

a barrel housed in the cavity of the body such as to be submerged in the hydraulic fluid;

a set of cylinders formed inside the barrel, each cylinder housing a piston translationally movable in the cylinder and comprising an intake hole configured to receive hydraulic fluid coming from the cavity and a discharge hole configured to send hydraulic fluid to an actuator of the propeller; and an annular groove formed in the body in fluid communication with the discharge hole;

each cylinder further comprises a discharge valve mounted on the discharge hole and configured to block the circulation of the hydraulic fluid of the annular groove in the direction of the cylinder;

the discharge valve is mounted in the cylinder;

each cylinder further comprises an intake valve mounted on the intake hole and configured to block the circulation of the hydraulic fluid of the cylinder in the direction of the cavity;

the intake valve is mounted near the sliding pad;

the intake valve is mounted in the cylinder;

the actuator of the propeller comprises two chambers and the mechanism further comprises a hydraulic valve configured to selectively put one of the chambers of the actuator in communication with the annular groove.

PRESENTATION OF THE DRAWINGS

Other features and advantages will become apparent on reading the following description of embodiments. This description will be given with reference to the appended drawings wherein.

DETAILED DESCRIPTION

Figure 1:
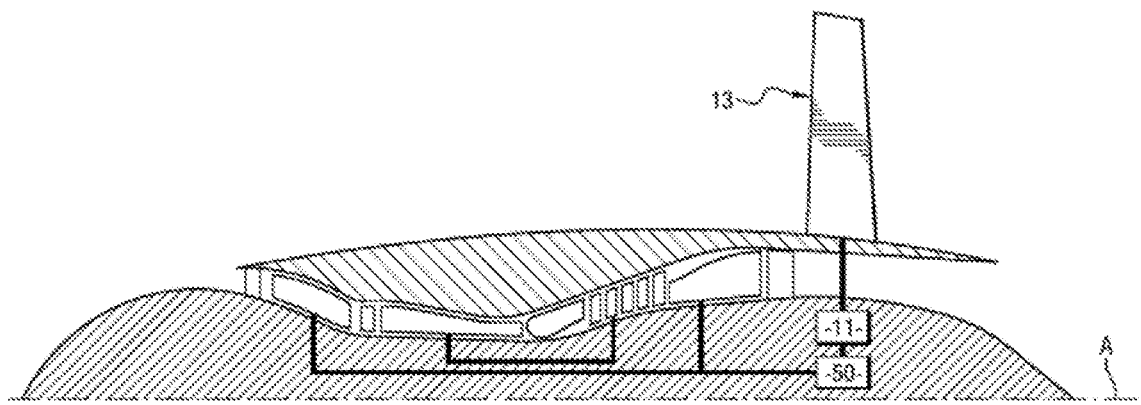
FIG. 1 is a schematic section view of an example of a turbomachine comprising a fan or a propeller with variable setting and a pitch change mechanism in accordance with an embodiment.

This disclosure is applicable to any turbomachine with variable setting comprising a pitch change mechanism. In particular, the disclosure relates to both bypass turbojet engines comprising a fan and turbomachines with propellers such as turboprops or else open rotors (unducted propeller) as shown in FIG. 1, in which the pitch of the blades of the fan or of the propeller is modifiable according to the flight conditions. In the remainder of the application, for the sake of simplicity in the description and claims, the term "propeller" will be used to denote either a propeller as described above or a fan of a turbojet engine.

Figure 2:
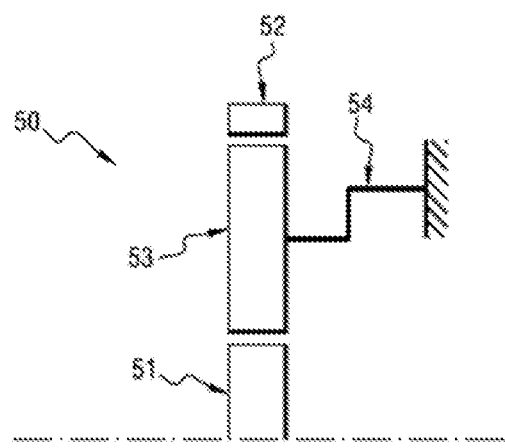
FIG. 2 is a partial and schematic section view of an exemplary embodiment of a planetary mechanical reducer which can be used in a turbomachine comprising a pitch change mechanism in accordance with an embodiment.
Figure 8:
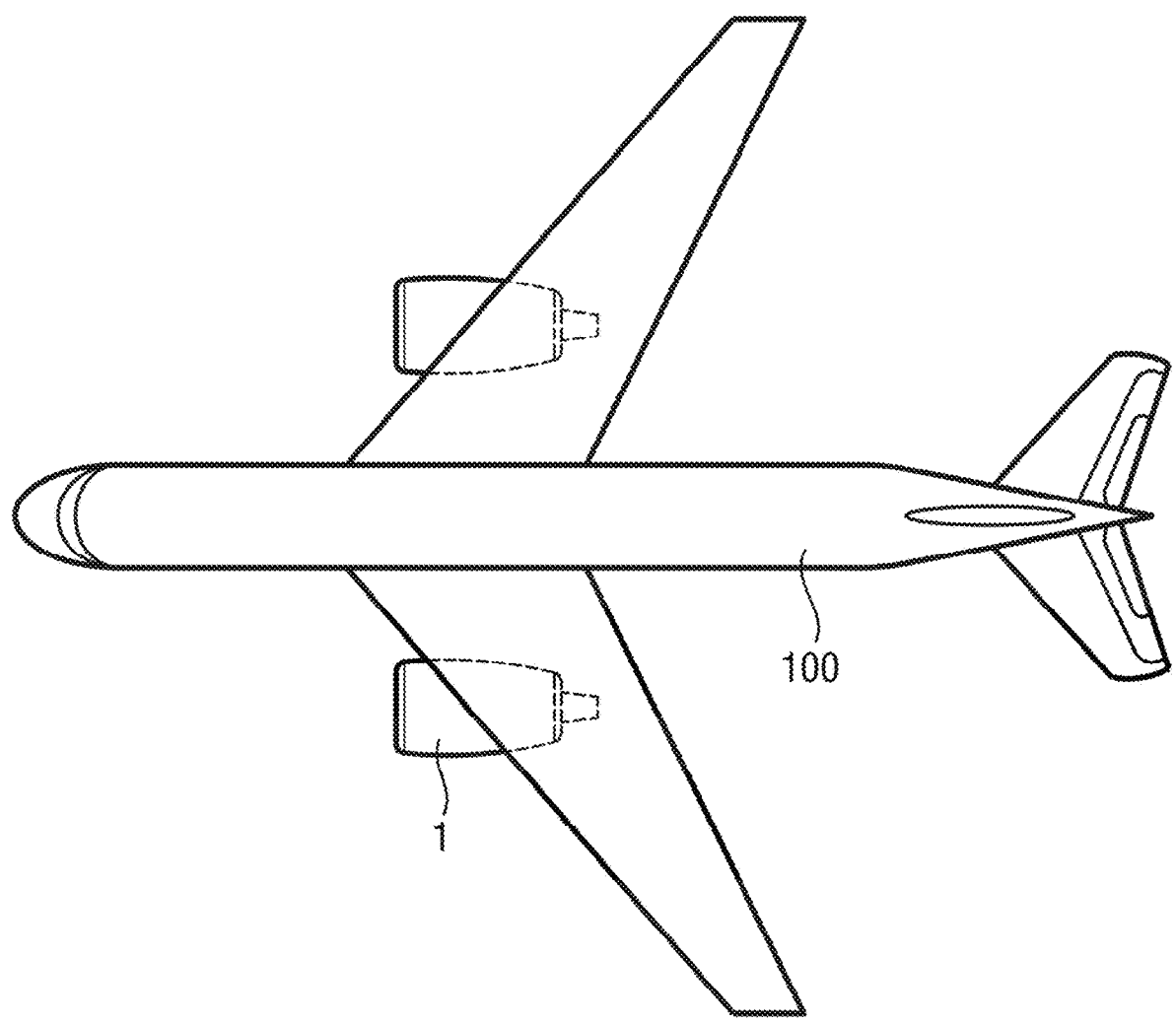
FIG. 8 is a schematic view of an airplane fuselage with engines according to embodiments of the invention.

Conventionally, the turbomachine comprises, in addition to the propeller, a mechanical reducer 50, as illustrated by FIG. 2 configured to rotationally drive the propeller. The reduction gear 50 is housed in a casing of the turbomachine. The turbomachine 1 as shown in FIG. 8 is configured to be fixedly mounted on an aircraft 100 by way of appropriate attaching means, such as a pylon. In the remainder of the text, the term "a stator part of the turbomachine" will denote any part fixedly mounted on a part of the turbomachine which is fixed with respect to the casing which is configured to be connected to the pylon, and "a rotor part of the turbomachine" will denote any part which is movable about an axis when the turbomachine is in operation and which, by definition, is therefore mounted movable with respect to the stator part. By way of example, the stator part comprises the casing of the turbomachine in which are housed means for driving the propeller etc. The rotor part for example comprises the propeller as well as its drive shaft.

Finally, in this application, the upstream and the downstream are defined with respect to the normal direction of flow of the gas in and through the propeller. Moreover, the "axis A" of the hydraulic pump refers to its axis of rotation. The axial direction is equivalent to the direction of the axis A and a radial direction is a direction perpendicular to this axis and passing through it. Moreover, the circumferential (or lateral) direction corresponds to a direction perpendicular to the axis A and not passing through it. Unless otherwise specified, the terms "inner" and "outer" are respectively used with reference to a radial direction such that the inner part or face of an element is nearer to the axis A than the outer part or face of the same element. In addition, an element is considered to be "in a fixed frame of reference" when it is kept rotationally immovable with respect to the axis A, whereas it is considered to be "in a rotating frame of reference" when it is able to be rotationally driven with respect to the axis A.

The reducer 50 is of planetary type and comprises:

a sun gear 51, centered on an axis of rotation of the reduction gear and configured to be rotationally driven by a drive input shaft of the turbomachine, a ring gear 52, coaxial with the sun gear 51 and configured to rotationally drive the drive shaft of the propeller about the axis of rotation, and a series of planet gears 53 circumferentially distributed around the axis of rotation of the reduction gear between the sun gear 51 and the ring gear 52, each planet gear being meshed internally with the sun gear 51 and externally with the ring gear 52. The series of planet gears 53 is mounted on a planet carrier 54 which is fixed with respect to a stator part of the turbomachine.

In a variant, the reduction gear 50 can be epicyclic, in which case the ring gear 52 is fixedly mounted on a stator part of the turbomachine and the drive shaft is rotationally driven by the planet carrier 54.

Figure 3:
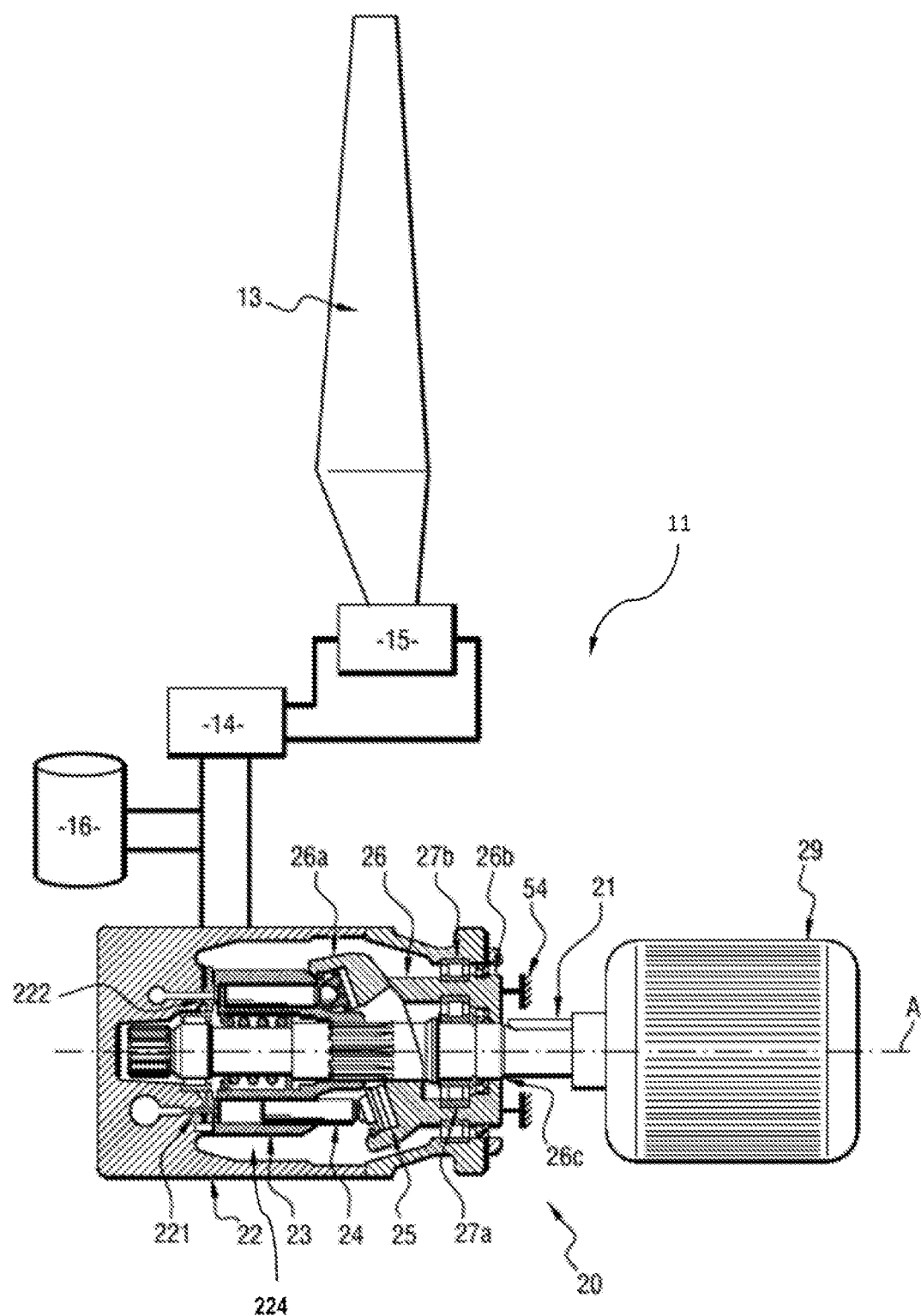
FIG. 3 is a schematic section view of an example of a turbomachine comprising a fan or a propeller with variable setting and a pitch change mechanism in accordance with an embodiment.

As illustrated in FIG. 3, the pitch change mechanism comprises an electrohydraulic actuator 11 (EHA for Electro Hydraulic Actuator), configured to actuate an actuator 15 which is mechanically connected to the propeller 13 in order to modify the pitch thereof, a hydraulic pump 20 configured to pressurize a fluid (typically oil) and an electric machine 29.

The electric machine 29 is fixedly mounted on the stator part of the turbomachine and comprises an actuating shaft 21 rotationally movable about an axis of rotation A.

The hydraulic pump 20 is a fixed-displacement axial-cylinder pump comprising a body 22 rotationally driven by the propeller 13, a set of pistons 24 circumferentially distributed around the axis of rotation A and a plate 26.

More precisely, the body 22 defines a cavity 224 in which a barrel 23 is accommodated in rotation. Bores forming cylinders configured to slidably receive the pistons 24 are formed in the barrel 23. The axis of translation of the pistons 24 is substantially parallel to the axis of rotation A. The barrel 23 and the pistons 24 are rotationally secured to the actuating shaft 21. Each piston 24 comprises a sliding pad 25 configured to bear against the platform 26. The sliding pads 25 are configured to freely slide along the plate 26 while bearing against the latter (constant contact) whatever the angular position of the pistons 24 around the axis of rotation A.

The plate 26 is mounted about the actuating shaft 21 while being inclined with respect to the axis of rotation A.

In a first embodiment, the plate 26 is fixedly connected to the stator part of the turbomachine to prevent its rotation about the axis of rotation A. The inclined plate 26 is therefore rotationally immovable about the axis of rotation A (thus in the fixed frame of reference). In an embodiment, the plate 26 can be mounted on the planet carrier 54 of the reduction gear 50. In a variant, when the reduction gear 50 is of epicyclic type (drive shaft driven by the planet carrier 54), the plate 26 can be mounted on the ring gear 52—note however that this configuration is more complex to implement than in the case of a planetary reducer mechanism.

The inclined plate 26 in particular comprises a first portion 26a comprising a face inclined with respect to the axis of rotation on which the sliding pads 25 then bear, and a second portion 26b configured to be attached to the stator part of the turbomachine, typically the planet carrier 54. The first portion 26a and the second portion 26b are traversed by a through hole 26c configured to receive the actuating shaft 21 of the electric machine 29. As indicated above, neither the first portion 26a nor the second portion 26b of the plate 26 are attached to this actuating shaft 21. The actuating shaft 21 is therefore rotationally movable with respect to these two portions of the plate 26.

For this purpose, the electrohydraulic actuator 11 comprises a first bearing 27a configured to support the actuating shaft 21 and a second bearing 27b configured to support the plate 26. The first bearing 27a can for example be mounted between the actuating shaft 21 and the second portion 26b of the plate 26 (in the inner wall defining the through hole 26c) whereas the second bearing 27b is mounted between the plate 26 and the body 22.

During the operation of the electrohydraulic actuator 11, the barrel 23 and the pistons 24 are rotationally driven by the actuating shaft 21 about the axis of rotation A. Since the pistons 25 are in constant bearing against the plate 26, this rotational movement has the effect of displacing the sliding pads 25 along an axis parallel to the axis of rotation A thus generating a to-and-fro movement, the amplitude of which is determined by the inclination of the plate 26 with respect to the axis of rotation A.

Figure 6:
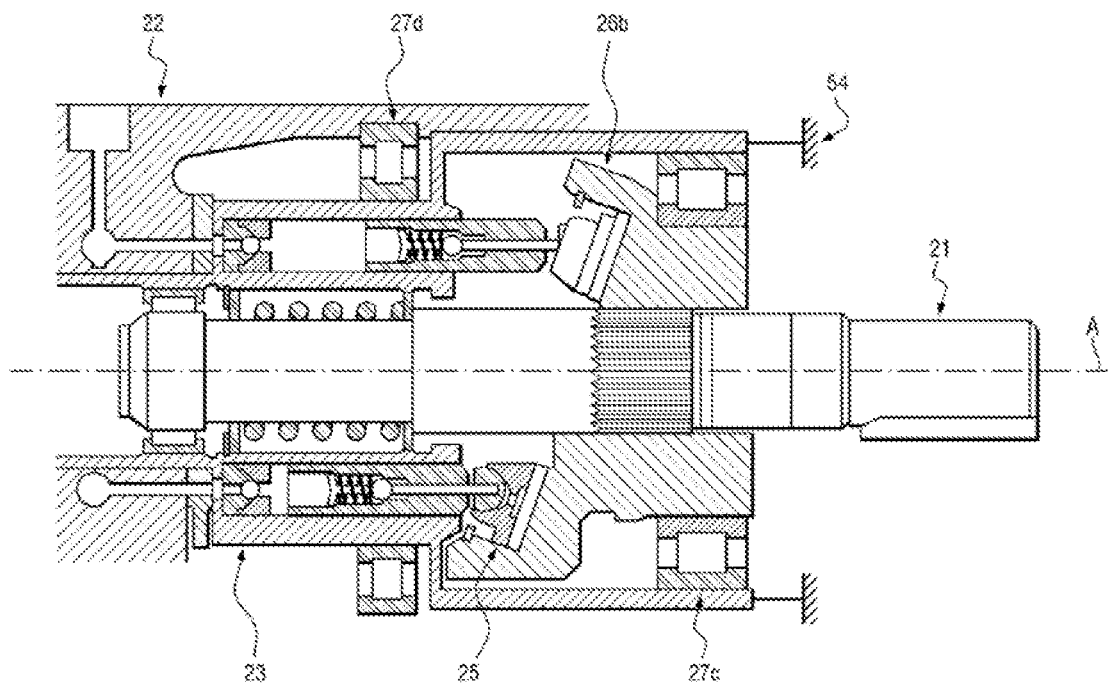
FIG. 6 is a schematic view of a pitch change mechanism of a propeller according to a variant embodiment.

In an alternative embodiment illustrated by FIG. 6, it's the barrel 23 which is rotationally immovable about the axis A (so in the fixed frame of reference). To do this, the barrel can be mounted on the planet carrier 54 of the reduction gear 50 or else, when the reduction gear 50 is of epicyclic type, the barrel 23 can be mounted on the ring gear 52. In this embodiment, it is then the inclined plate 26 which is rotationally driven by the actuating shaft 21 about the axis of rotation A, in order to generate the to-and-fro movement of the pistons. As described previously, the plate 26 then comprises a first portion 26a comprising a face inclined with respect to the axis of rotation on which the sliding pads 25 then bear, and a second portion 26b configured to be attached to the actuating shaft 21.

To allow the rotational locking of the barrel, the electrohydraulic actuator 11 comprises a first bearing 27c configured to support the plate 26 and a second bearing 27d configured to support the barrel 23. The first bearing 27c can for example be mounted between the plate 26 and the barrel 23, in particular at the level of a portion connecting the latter to the fixed frame of reference, whereas the second bearing 27d is mounted between the barrel 23 and the body 22.

During the operation of the electrohydraulic actuator 11, the plate 26 is rotationally driven by the actuating shaft 21 about the axis of rotation A. The barrel 23 is fixed. Since the pistons 25 are constantly bearing on the plate 26, this rotational movement has the effect of displacing the sliding pads 25 along an axis parallel to the axis of rotation A thus generating a to-and-fro movement, the amplitude of which is determined by the inclination of the plate 26 with respect to the axis of rotation A.

This alternative embodiment allows an operation of the pump strictly analogous to that described previously.

Such an architecture thus makes it possible to obtain an electrohydraulic actuator 11, the operation of which is independent of the rotation of its body 22, this rotation being discharging only when the actuating shaft 21 is rotationally driven by the electric machine 29. However, the rotation of the actuating shaft 21 is independent of the operation of the turbomachine, since the electric machine 29 is not actuated by the reduction gear 50. This operating mode has the advantage of allowing the modification of the pitch of the propeller 13 even when the turbomachine is shut down. Thus, it is possible to proceed to a feathering of the propeller 13 even in the event of a failure of the turbomachine in flight. It is moreover possible to modify the pitch of the propeller 13 before the starting of the turbomachine and thus fulfil the function of exiting from the feathered position. In addition, it is then no longer necessary to overdimension the electric machine 29, the setting of the actuating shaft 21 in rotation by the electric machine 29 only being required when there is a command to change pitch.

Furthermore, since the operation of the electrohydraulic actuator 11 is independent of the rotation of its body 22, the operation of the hydraulic pump 20 can be entirely controlled by the electric machine 29. This operating mode then makes it possible to vary the hydraulic fluid pressure produced simply by varying the operating parameters of the electric machine 29. In particular, the pitch being directly controlled by the hydraulic pump pressure produced by the hydraulic fluid pump 20, which depends on the speed of displacement of the pistons 24, the control of the pitch of the propeller 13 can be done using a servo coupled to the electric machine 29. In an embodiment, the electric machine 29 is an asynchronous machine, such a machine not requiring any resistive torque in the event of a short circuit and thus reducing the risk of fire.

Moreover, the pump here has a fixed displacement, which improves the lifetime of the electrohydraulic actuator and its robustness, by comparison with a pump with variable displacement.

In an embodiment, the electrohydraulic actuator 11 further comprises a hydraulic fluid tank 16 rotationally secured to the propeller 13. The tank has the function of guaranteeing a minimum pressure at the pump feed through a check valve and also has the function of avoiding any risk of overpressure at the discharge through an overpressure valve in the event of heating.

The body 22 of the hydraulic pump 20 further comprises a discharge aperture 221 and an intake aperture 222 in fluid communication, firstly with the cylinders of the pistons 24 and secondly with an actuator 15 of the pitch change mechanism to supply said actuator 15 with pressurized fluid. Since body 22 of the hydraulic pump 20 is rotationally secured to the propeller 13, the discharge 221 and intake 222 apertures are also rotationally movable with respect to the pistons 24, thus rendering distribution by port plate inappropriate. Specifically, during a pitch command, the discharge 221 and intake 222 apertures will no longer have a correct angular position with regard to the stroke of the pistons 24. Consequently, the hydraulic pump 20 is chosen such that the distribution is unaffected by the angular position of the body 22 (see in particular FIG. 4).

The actuator 15 preferably comprises a double-action cylinder comprising a first chamber 151 and a second chamber 152 in fluid communication with the discharge aperture 221 and the intake aperture 222 successively. The actuation of the hydraulic pump 20 by the electric machine 29 thus has the effect of filling (or emptying respectively) the first chamber 151 and emptying (or filling respectively) the second chamber 152. The actuator 15 is moreover rotationally secured to the propeller 13 and connected thereto such that the actuation of the actuator 15 (by successive filling and emptying of the first and second chambers) has the effect of modifying the pitch of the propeller 13.

Figure 4:
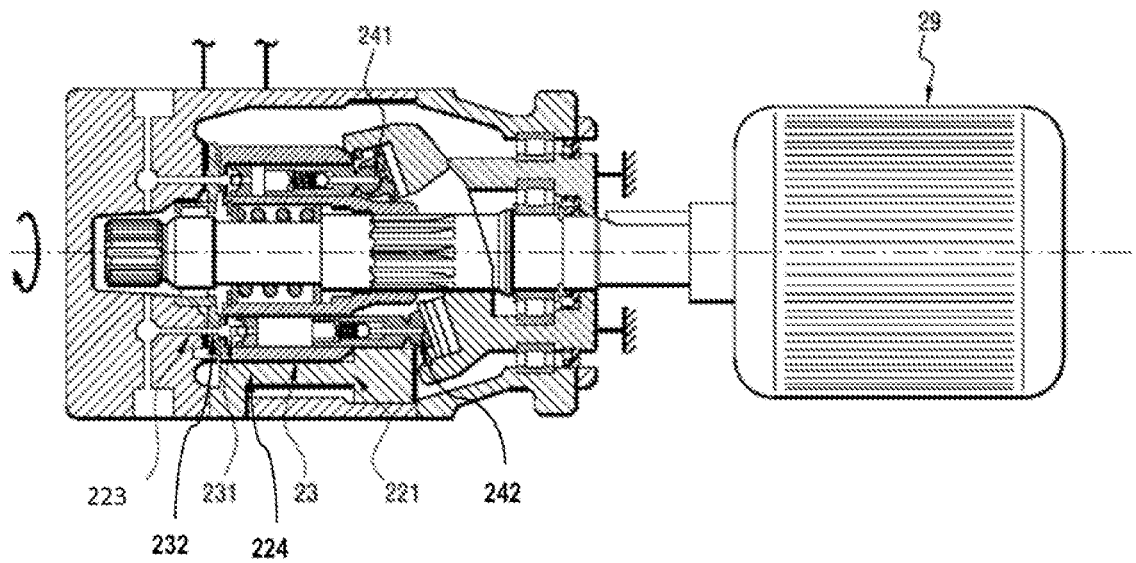
FIG. 4 is a schematic view of a pitch change mechanism of a propeller according to a variant embodiment.

In a variant embodiment illustrated in FIG. 4, the cavity 224 of the body 22 is filled with hydraulic fluid, thus making it possible to use it as a hydraulic fluid reservoir. Where applicable, the cavity 224 is supplied with hydraulic fluid by the hydraulic fluid reservoir 16.

The barrel 23 is submerged in the hydraulic fluid contained by the cavity 224.

Figure 5:
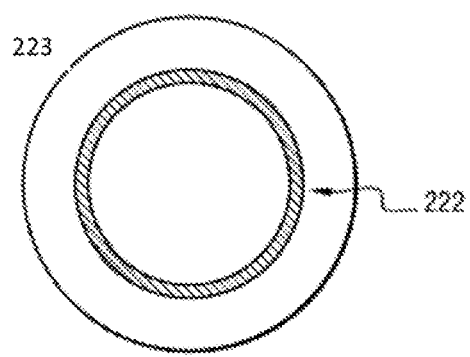
FIG. 5 is a schematic view of an example of an annular groove formed in the body of a pump.

In this variant embodiment, the cylinders comprise an intake hole 242 configured to receive hydraulic fluid coming from the cavity 224 as well as a discharge hole 232 configured to discharge the hydraulic fluid contained in the cylinder to the actuator 15 of the propeller by way of an annular groove 223 formed in the body 22 (FIG. 5). Thus, in this variant embodiment, the annular groove 223 replaces the port plate distribution using two apertures (suction and discharge) conventionally used to put the cylinders of the pistons 24 in communication with the actuator 15.

The use of such an annular groove 223 in fluid communication with the discharge holes of the cylinders allows the pump to operate whatever the angular position of the body 22 and thus of the discharge holes during the movement of the pistons 24.

In an embodiment, each cylinder comprises means in the form of a discharge valve 231 mounted at the discharge hole 232. Each discharge valve 231 has an open configuration, in which the discharge valve 231 is open and allows the hydraulic fluid to flow from the cylinder to the annular groove 223, and a closed configuration, in which the discharge valve 231 closes the cylinder and prevents the circulation of hydraulic fluid between the cylinder and the annular groove 223. In the closed configuration, the discharge valve 231 thus makes it possible to block the return of pressurized hydraulic fluid coming from the annular groove 223 in the direction of the cylinders. Since the body 22 is rotationally movable, the discharge valves 231 are preferably mounted inside the cylinders and position themselves automatically (passively) in the open or closed configuration according to the position of the piston 24 in the cylinder.

Similarly, each cylinder comprises means 241 configured to control the circulation of the hydraulic fluid between the cylinder and the barrel. In an embodiment, the means 241 comprise an intake valve 241 mounted at the intake hole 242. Each intake valve 241 has an open configuration, in which the intake valve 241 is open and allows the hydraulic fluid to circulate from the barrel to the cylinder, and a closed configuration, in which the intake valve 241 closes the cylinder and prevents the circulation of hydraulic fluid between the cylinder and the barrel. In the closed configuration, the intake valve 241 thus makes it possible to block the return of pressurized hydraulic fluid coming from the cylinder in the direction of the barrel. Since the barrel is rotationally movable, the intake valves 241 are preferably mounted inside the cylinders and automatically position themselves (passively) in the open or closed configuration according to the position of the piston 24 in the cylinder. Where applicable, the intake valves 241 can in particular be mounted near the sliding pad 25.

The pump thus described is thus functional whatever the angular position of its body 22. Since this pump is not reversible due to the configuration of the discharge and intake holes, the hydraulic actuator 11 can moreover comprise a hydraulic flow switching valve 14, positioned in the hydraulic circuit between the annular groove 223 and the actuator 15. The hydraulic flow switching valve 14 is in particular configured to selectively connect one or the other of the chambers of the actuator 15 to the annular groove 223 and to the cavity 224, according to the actuation needs of the actuator 15 to obtain the desired pitch setting for the propeller.

The hydraulic flow switching valve 14 is controlled by a controller of the pitch change mechanism so as not to put the annular groove 223 in fluid communication with the first or the second chamber 152 of the actuator 15, according to the direction in which the setting of the propeller must be modified. When the setting of the propeller must be modified, the controller commands the electric machine to set the actuating shaft 21 in rotation and to rotationally drive the barrel 23 (or where applicable the plate 26). The rotation of the barrel 23 (or where applicable the plate 26) has the effect of setting the pistons 24 in rotation about the axis of rotation of the drive shaft. Since the sliding pads of the pistons 24 are in constant contact with the plate, which is inclined, the rotation of the actuating shaft 21 then generates an axial movement of the pistons 24 in their respective cylinder making it possible to take in and discharge the hydraulic fluid. In particular, when one of the pistons 24 enters an intake configuration, in which its intake valve is in the open configuration and its discharge valve is in the closed configuration in order to allow the hydraulic fluid to enter the cylinder, another of the pistons enters a discharge configuration in which its intake valve is in the closed configuration and its discharge valve is in the open configuration, allowing the hydraulic fluid to leave the discharge hole 232 of the cylinder toward the annular groove 223, and conversely. The pistons 24 thus successively discharge pressurized hydraulic fluid to the annular groove 223. This pressurized hydraulic fluid is then brought conveyed from the annular groove 223 to the flow rate switching valve 14, which according to its position (defined by the controller and the setting command of the propeller) will send this pressurized hydraulic fluid to one or the other of the chambers of the actuator 15. The modification of the pitch caused by the rotational driving of the actuating shaft 21 can then be measured to determine a torque control for the electric machine 29 making it possible to attain the desired pitch.

Conventionally, the pitch change mechanism can further comprise a system for feathering which is functional in the event of an absence of hydraulic fluid pressure. In an embodiment, the feathering system comprises counterweights of flyweight type.

Figure 7:
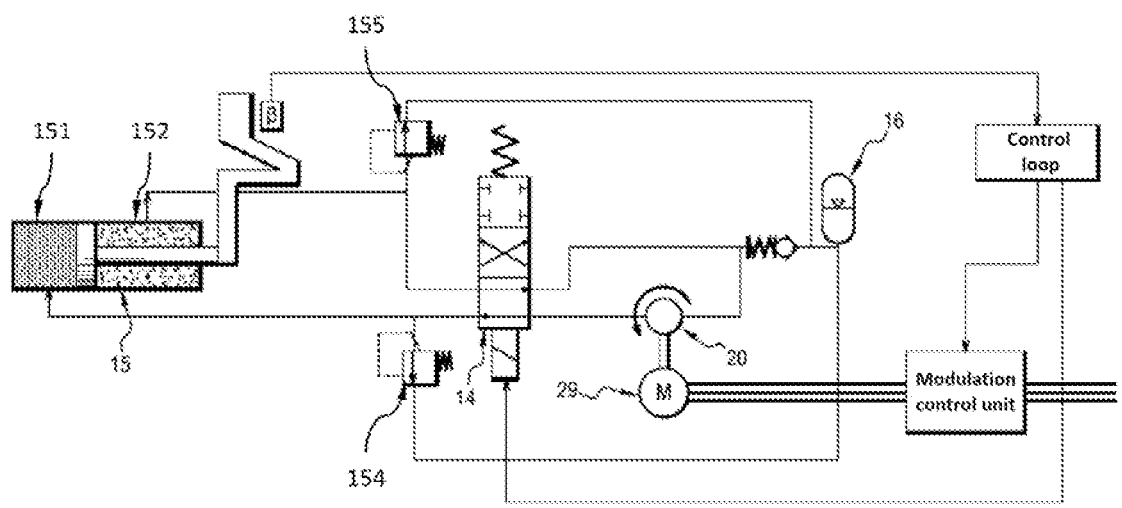
FIG. 7 is a schematic view of a pitch change mechanism of a propeller according to a variant embodiment.

When the hydraulic pump used in the pitch change mechanism is not reversible, the pitch change mechanism can further comprise a flow rate switching valve 14 configured to selectively put the hydraulic pump 20 in fluid communication with the first chamber 151 or the second chamber 152 of the actuator 15, in such a way as to allow the modification of the pitch of the propeller (see for example in FIG. 7).

However when a reversible hydraulic pump is used it is not necessary to use such a flow rate switching valve, since each of the chambers of the actuator can be connected to one of the outlets of the hydraulic pump.

This configuration of the pitch change mechanism thus makes it possible to dispense with the use of an oil transfer bearing (OTB), thus eliminating the risks of leaks and the associated oil scavenging pumps, as well as the associated overdimensioning with the oil tank. The circuit is moreover independent of the lubrication unit. In particular, the pressure delivered by the hydraulic pump 20 can reach significant levels (in the order of 300 bars), which simplifies the dimensioning of the actuator 15.

The invention claimed is:

1. A pitch change mechanism for a propeller of a turbomachine, the pitch change mechanism comprising an electrohydraulic actuator comprising:
an electric machine configured to be fixedly mounted on a stator part of the turbomachine and comprising an actuating shaft rotationally movable about an axis of rotation;
an axial-piston hydraulic pump suitable for pressurizing a hydraulic fluid, the hydraulic pump comprising:
a body configured to be driven by the propeller;
a barrel housing a set of pistons circumferentially distributed around the axis of rotation, each piston comprising a sliding pad; and
a plate inclined with respect to the axis of rotation, each sliding pad bearing on the plate; one element from among the inclined plate and the barrel being configured to be fixedly connected to the stator part of the turbomachine so that rotation of the one element is prevented about the actuating axis and another element from among the inclined plate and the barrel being rotationally secured to the actuating shaft.

2. The pitch change mechanism as claimed in claim 1, wherein the electric machine is an asynchronous machine.

3. The pitch change mechanism of claim 1, wherein the inclined plate is configured to be fixedly connected to the stator part of the turbomachine and the pitch change mechanism further comprising a first bearing configured to support the actuating shaft and a second bearing configured to support the inclined plate.

4. The pitch change mechanism of claim 3, wherein the first bearing is mounted between the actuating shaft and the inclined plate.

5. The pitch change mechanism of claim 3, wherein the second bearing is mounted between the inclined plate and the body.

6. The pitch change mechanism of claim 3, wherein the inclined plate comprises a first portion comprising a face inclined with respect to the axis of rotation on which the sliding pads are bearing, and a second portion configured to be attached to the stator part of the turbomachine.

7. The pitch change mechanism of claim 1, wherein the barrel is fixedly connected to the stator part of the turbomachine, the pitch change mechanism further comprising a first bearing configured to support the inclined plate and a second bearing configured to support the barrel.

8. The pitch change mechanism of claim 7, wherein the first bearing is mounted between the inclined plate and the barrel.

9. The pitch change mechanism of claim 7, wherein the second bearing is mounted between the barrel and the body.

10. The pitch change mechanism of claim 1, wherein the one element from among the plate and the barrel which is configured to be fixedly connected to the stator part of the turbomachine is configured to be mounted on a planet carrier of a planetary mechanical reducer.

11. The pitch change mechanism of claim 1, wherein a pitch of the propeller is controlled by torque control of the electric machine.

12. The pitch change mechanism of claim 1, further comprising a hydraulic fluid reservoir which is rotationally secured to the propeller.

13. The pitch change mechanism of claim 1, wherein the body delimits a cavity filled with hydraulic fluid and wherein the pitch change mechanism further comprises:
a barrel housed in the cavity of the body such as to be submerged in the hydraulic fluid;
a set of cylinders formed inside the barrel, each cylinder housing a piston translationally movable in the cylinder and comprising an intake hole configured to receive hydraulic fluid coming from the cavity and a discharge hole configured to send hydraulic fluid to an actuator of the propeller; and
an annular groove formed in the body in fluid communication with the discharge hole.

14. The pitch change mechanism of claim 13, wherein each cylinder further comprises a discharge valve mounted on the discharge hole and configured to block circulation of the hydraulic fluid of the annular groove towards the cylinder.

15. The pitch change mechanism of claim 14, wherein the discharge valve is mounted in the cylinder.

16. The pitch change mechanism of claim 13, wherein each cylinder further comprises an intake valve mounted on the intake hole and configured to block circulation of the hydraulic fluid of the cylinder towards the cavity.

17. The pitch change mechanism of claim 16, wherein the intake valve is mounted near the sliding pad.

18. The pitch change mechanism of claim 16, wherein the intake valve is mounted in the cylinder.

19. The pitch change mechanism of claim 13, wherein the actuator of the propeller comprises two chambers and the mechanism further comprises a hydraulic valve configured to selectively put one of the chambers of the actuator in communication with the annular groove.

20. A turbomachine comprising a propeller, an actuator mechanically connected to the propeller and a pitch change mechanism as claimed in claim 1, wherein the pitch change mechanism is configured to actuate the actuator.

21. An aircraft comprising at least one turbomachine as claimed in claim 20 connected to the aircraft by way of a pylon.

\* \* \* \* \*